May 4, 1965　　　　K. PFLEIDERER　　　　3,181,816
FETTERED ROTARY WING AIRCRAFT
Filed Sept. 3, 1963　　　　2 Sheets-Sheet 1

INVENTOR
Kurt Pfleiderer

By  McGlew and Toren
ATTORNEYS

May 4, 1965  K. PFLEIDERER  3,181,816
FETTERED ROTARY WING AIRCRAFT
Filed Sept. 3, 1963  2 Sheets-Sheet 2

INVENTOR
*Kurt Pfleiderer*

By McGlew and Toren
ATTORNEYS 3,181,816
FETTERED ROTARY WING AIRCRAFT
Kurt Pfleiderer, Munich, Germany, assignor to Firma Bolkow-Entwicklungen Kommanditgesellschaft, Ottobrunn, near Munich, Germany
Filed Sept. 3, 1963, Ser. No. 306,246
Claims priority, application Germany, Sept. 12, 1962, B 68,814
17 Claims. (Cl. 244—17.17)

This invention relates in general to rotary wing aircraft construction, and in particular to a new and useful rotary wing aircraft which is held captive or fettered by means of a connecting cable at the ground and which is capable of effecting a hovering flying action as well as vertical flying movement and turns.

The present invention particularly relates to the construction of a rotary wing aircraft of the above-mentioned type which has stable flying characteristics during hovering and which is capable of auto-rotation.

As is known, rotary wing aircraft which are constructed as helicopters wherein lifting and forward flight is caused by one or several engine-driven rotors, have the particular advantage that such helicopters can hover stationarily for extended periods of time. In some instances the originally unstable flying characteristics of a helipcopter can exert a negative influence on the hovering, and in the case of disturbances such as strong winds, for example, it may be necessary constantly to control the helicopter in an opposite direction in order to prevent crashing. This danger occurs particularly during gusts which cause vibrations of the helicopter.

In a rotary wing aircraft, such as an auto-gyro or gyroplane, wherein only the lifting is caused by one or several rotors while the forward flight is produced by a horizontally extending propeller or jet engine, more stable flying characteristics are present. In accordance with the invention, a rotary wing aircraft is provided having good hovering characteristics of a helicopter combined in an advantageous manner with the stable flying characteristics of a gyro-plane. The device of the invention is preferably constructed so that it has satisfactory hovering characteristics while still having the lowest possible power requirements.

In accordance with the invention, there is provided a central body which is connected with a fettering means such as a connecting cable, and which body is advantageously arranged either in a stationary manner or under a condition of controlled rotation. A rotary body is concentrically arranged relative to the central body and is rotatably mounted thereon. At the rotary body at least two laterally extending carrier members (or a single carrier member and a counterbalancing member) are arranged which extend in opposite directions. At least one of the carrier members has at its free end a propelling means such as a rotatable air screw or propeller. The construction further includes at least one rotatable flight supporting blade which is arranged at one of the carriers for rotation around a vertical axis for controlling vertical flight.

In accordance with one feature of the invention which is advantageous for both transport and for servicing the carrier members are connected with the rotary body through detachable or releasable couplings. According to a further feature of the invention the carriers may be constructed as aerodynamic wings which assist in maintaining the aircraft in flight.

In addition to the possibility of using the inventive aircraft structure for different civilian purposes, for example as antenna carriers for transmissions of short duration, as advertising carriers, or the like, a preferred use of the device is in the military field. For this purpose the central body may serve as a receptacle for strategic loads, the term "strategic loads" referring in this context, for example, to long range cameras for surveying a certain section of the terrain or for the remote control of flying bodies, radar antennas, and the like.

Since both for civilian use and military use the noise generation of the aircraft should be as low as possible, the inventive construction provides a further embodiment in which the propellers are advantageously driven by means of an electric motor which is supplied with current from the fettering cable.

A further feature of the construction is in the means for controlling the steering of the aircraft about its longitudinal and transverse axes which may be accomplished by means of a fuselage (central body) tilting control. Such control may be accomplished, for example, by means of winding motor elements which may be arranged for varying the lengths of one or more separate connecting lines to the fettering cable for tilting the central body or for shifting the connection of the central body in respect to the connecting cable, or for changing the axis of the connection of the central body to the fettering cable.

According to a further feature of the invention, the central body of the aircraft is controlled in relation to the rotary portion by means of an auxiliary rotor which is mounted on an outwardly extending arm carried by the central body. With still another arrangement, an electric motor is provided with a stator and an armature arranged between the central body and the rotary body, and adjustment of the relative positions of the central body and the rotary body is made in accordance with the magnitude of the electrical field exciting the motor.

Accordingly, it is an object of the invention to provide an improved flying device.

A further object of the invention is to provide a fettered rotary wing aircraft.

A further object of the invention is to provide a rotary wing aircraft which includes a central body portion adapted to be held in a stationary position and a rotary body portion rotatably mounted on the central body portion and including at least two carrier members which extend outwardly in opposite directions, with at least one of the carrier members having propulsion means at the outer end for causing rotation of the rotary body about its mounting on the central body, and an additional rotor blade for controlling or influencing the vertical flight of the aircraft.

A further object of the invention is to provide a rotary wing aircraft which is adapted to be connected to the ground by a control cable and which includes a central body on which is mounted a rotatable body with at least one radially extending arm which advantageously may be an air foil element for aiding in vertical flight with means adjacent the outer end of the arm for effecting rotation thereof, and with further rotor means carried at the outer end of said arm which is rotatable about a substantially vertical axis for aiding in the vertical flight of the device.

A further object of the invention is to provide a rotary wing aircraft which includes a central body portion connected to the ground by fettering means, and with means for controlling the position of the central body portion in respect to the connecting cable for the purpose of controlling the flight direction.

A further object of the invention is to provide a rotary wing aircraft including a substantially stationary central body upon which is mounted a rotatable body, with means for controlling the position of the central body in relation to the rotatable body.

A further object of the invention is to provide a rotary wing aircraft which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
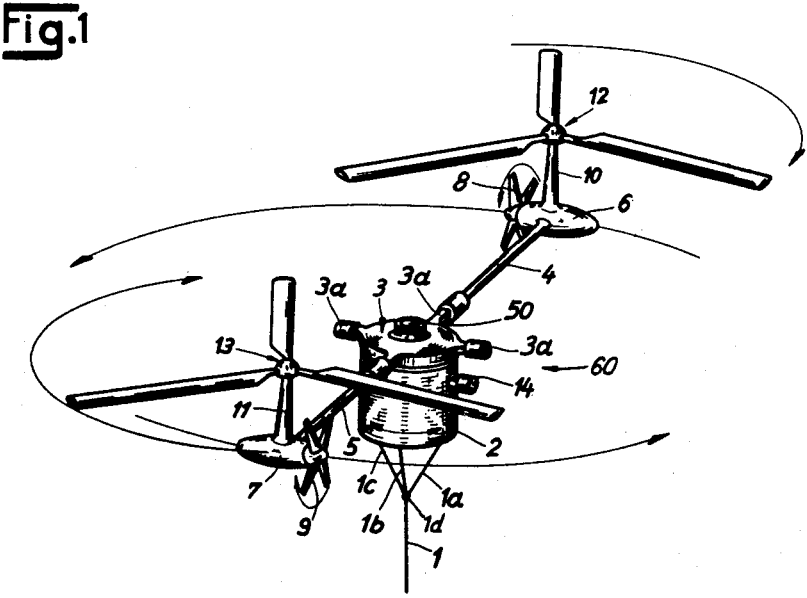
FIG. 1 is a perspective elevation of a rotary wing aircraft constructed in accordance with the invention.

Referring to the drawings in particular, the invention embodied therein as indicated in FIG. 1 comprises a rotary wing aircraft 60 which is held captive by a fettering cable or rope 1. The end of the cable 1 is wound on a rope drum (not shown) which is secured to the ground. The upper end of the cable engages attitude control cables 1a, 1b and 1c, which extend outwardly in a pyramidal manner from a connection 1d to the cable 1. The upper end of the attitude control cables 1a, 1b and 1c are advantageously connected with a cylindrical body 2 in the manner shown in FIG. 3, for example, which will be described more fully hereinafter.

Figure 2:
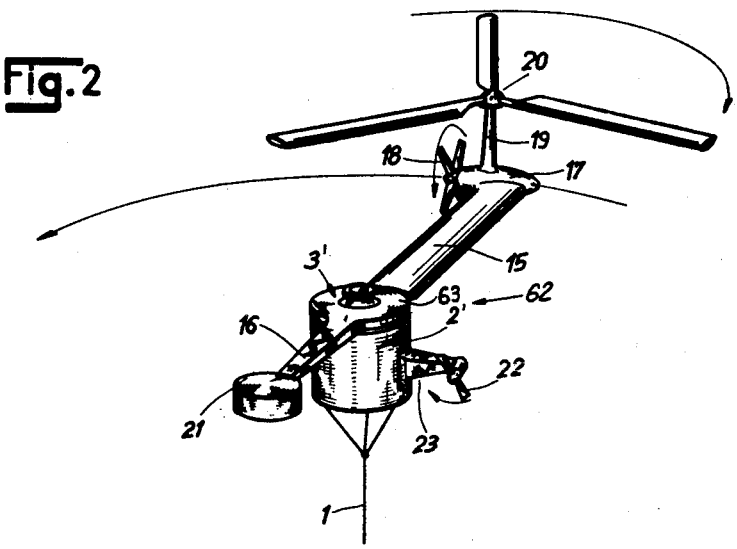
FIG. 2 is a view similar to FIG. 1 of another embodiment of the invention.

In accordance with the embodiment of the invention indicated in FIGS. 1 and 2, the central body 2 is held substantially stationary by the fettering cable 1, and a rotary body generally designated 3 is rotatably mounted thereon and is secured against axial movement. In the embodiment of FIG. 1, the rotary body carries four reception sleeves 3a. Two laterally extending, diametrically opposed carriers or carrier arms 4 and 5 are received in two of the sleeves 3a. Adjacent the outer ends of each of the carriers 4 and 5, there is mounted a driving device which in the embodiment illustrated includes an electric motor or internal combustion engine (not shown), which driving devices are arranged in streamlined gondola parts 6 and 7. The driving devices within the gondola elements 6 and 7 in the embodiment illustrated are indicated as being connected to rotate the propellers 8 and 9, respectively. In some instances, however, it is advantageous to provide jet reaction drives in place of the rotary propellers. An electric motor drive for the rotary propellers is particularly advantageous, however, when quiet operation is desired, and in such instance the current for operating driving motors is supplied through a portion of the fettering cable 1 upwardly through the central body 2 and outwardly through the respective carriers 4 and 5.

In the embodiment of FIG. 1, substantially vertically extending arms or mounts 10 and 11 are provided on each of the gondolas 6 and 7, respectively. The arms 10 and 11 are arranged substantially parallel to the axis of the central body 2. The upper ends of the arms 10 and 11 carry flight sustaining rotors or carrier rotors generally designated 12 and 13 which are rotated in the direction of the arrows indicated either by the driving means carried in the respective parts 6 and 7 or by the air action thereon as the carriers 4 and 5 are rotated for the purpose of sustaining flight.

In a preferred arrangement, each carrier or assembly 4 and 5 with its associated elements, including the gondola elements 6 and 7 and the rotors 12 and 13, is advantageously made as a single unit which may be detachably secured in the sleeve 3a. The securement in sleeve 3a is by means to insure that no movement will take place in either an axial or rotational manner during the high speed operation of the device. The coupling connection, however, should also be such so as to permit the rapid removal of the elements for the purpose of rapid servicing and quick readying of the aircraft.

The action of the aircraft of FIG. 1 is as follows: Before use, the device in the assembled condition is held in a reception device on the ground (not shown) in the normal flight hovering position. The fettering cable 1 is wound on a drum. After the driving devices for the propellers have been started, the propellers 8 and 9 start to rotate and move the carriers 4 and 5 in the directions indicated by the arrows. The flight sustaining rotors 12 and 13 are also caused to rotate about their own axes and at the same time will rotate about the axis of the central body 2. In order to accelerate the starting procedure, a rope disc 50 is arranged at the rotary body 3. For rapid starting of the device, the rope is quickly drawn off from the disc 50 in order to rapidly bring the carriers 4 and 5 up to a speed for lifting the device from the ground in a shorter period of time than would be obtained with a drive through the relatively rapidly rotating propellers 8 and 9 alone. As soon as the necessary lift-off speed has been obtained, the ground securing hovering devices are released and the aircraft is permitted to lift off while the fettering cable is unwound from the drum.

The preferred use for the aircraft is for military purposes, that is in the military field where the device may, for example, be fitted with a long range television camera for observing a predetermined terrain section. For this purpose, and in accordance with the invention, the central body is constructed as a receptacle for strategic loads.

In FIG. 1 an observation camera is mounted in the central body 2, and the objective lens 14 thereof is indicated. In addition, for receiving a camera such as a television or movie camera, the central body 2 which is constructed as a container, can also accommodate a transmission arrangement, a radar antenna or the like. In this latter instance the size and the shape of the central body would be adapted to the respective load to be accommodated therein. The invention, therefore, is by no means limited to the cylindrical shape of the central body 2.

In addition to the indicated arrangement of the carriers 4 and 5, other embodiments of carriers may be chosen. For example, instead of two rotor carrier elements 4 and 5, three or more may be provided with one or several other blades. Obviously rotation of the rotary body with the carriers 4 and 5 relative to the central body 2 will cause an uncontrolled rotation of the central body 2. Unless this rotation is controlled or prevented in a manner suggested by the embodiments of FIGS. 2 and 6, rotation of the body 2 will cause twisting of the cable 1. Therefore suitable means must be provided either to control the movement of body 2 (FIG. 2) or to provide a transmission between the body 2 and the cable 1 allowing relative rotation between the two or permitting the cable or a portion thereof to rotate without twisting unduly (FIG. 6).

In FIG. 2, there is indicated a rotary aircraft generally designated 62 which comprises a central body 2' having a rotatable body 3' which includes carrier elements or rotor elements 15 and 16 which are integrally formed with a central disc portion or rotary portion 63. Only one of the carriers, the carrier 15, carries at its free end a gondola 17 for driving means for the propeller 18 and for the flight sustaining rotor or propeller 20 which is mounted at the upper end of a supporting arm 19. At the free end of the arm 16 there is mounted a counterweight 21.

In the embodiment of FIG. 2, in order to control the central body about its center axis, there is provided an auxiliary rotor 22 which is mounted on the end of a radially extending arm 23. The arm 23 is rigidly secured to the central body 2' and the auxiliary rotor 22 is driven either by a drive motor associated with the rotor or through a mechanical driving connection with the central body 2' (not shown). The auxiliary rotor 22 may also be employed in a device of the character indicated in FIG. 1 in order to control the position of the central body in relation to the rotating body 3. This is of great importance when the device is used as a carrier for an observation arrangement, such as for positioning the camera lens 14. In dependence on the speed of the auxiliary rotor 22, it is possible to control the position of the camera lens 14.

Figure 6:
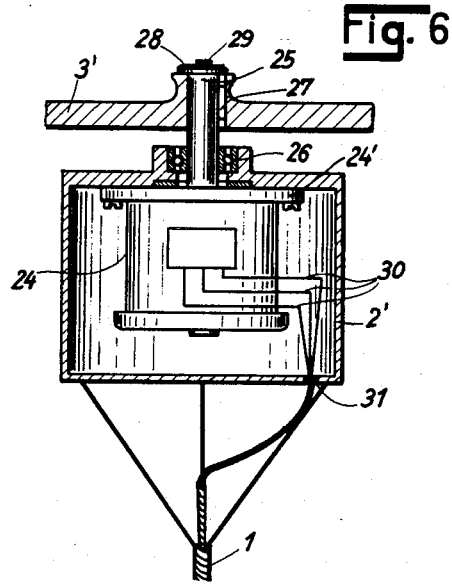
FIG. 6 is a transverse sectional view of a portion of the central body and rotary body indicating a means for controlling the position of the central body in relation to its central axis.

An additional manner of displacing the central body 2 in relation to the rotary body 3 or 3' is indicated in the example shown in FIG. 6. In this arrangement, the central body 2' is provided with an electric motor 24 which is arranged between the central body 2' and the rotary body 3'. As indicated in FIG. 6, the motor 24 is connected, by means of a flange 24', to the interior wall of the central body 2'. The motor 24 includes a shaft 25 which is rotated by the rotor (not shown) of the motor 24, which shaft projects from the motor through a ball bearing 26 carried by the central body 2'. The ball bearing 26 absorbs any bending forces which are the result of the rotary body 3. The end of the shaft 25 is connected, by means of a key 27, with the rotary body 3' so as to rotate therewith. The rotary body 3' is anchored against axial movement by a disc 28 and a screw 29. Current is supplied through connections 30 which extend from the cable 1 through an opening 31 in the central body 2'. By exciting the field of the motor 24, a precisely defined rotation of the central body relative to the permanently rotating rotary body can be initiated. This permits the precise positioning of the central body 2' in relation to the rotary body 3'.

Figure 4:
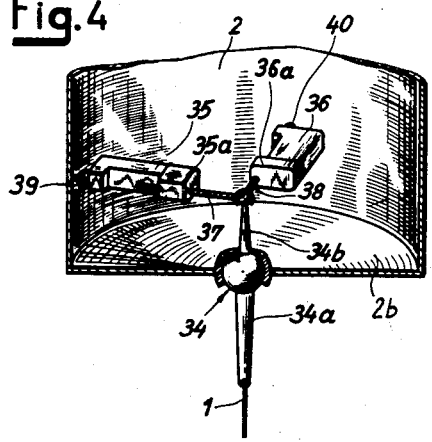
FIG. 4 is a view similar to FIG. 3 of another embodiment of the invention.
Figure 5:
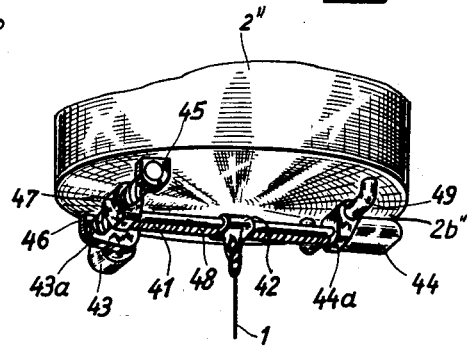
FIG. 5 is a view similar to FIG. 3 of still another embodiment of the invention.
Figure 3:
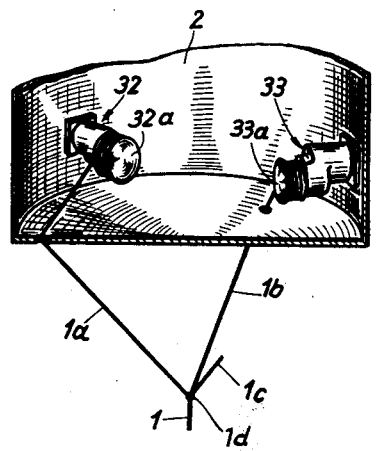
FIG. 3 is a partial sectional and partial perspective view of a central body for the rotary wing aircraft indicating the connection of the attitude control cables to the fettering cable.

In FIGS. 3, 4 and 5 there are indicated different embodiments of devices for controlling the rotary wing aircraft about its longitudinal and transverse axes for the purpose of steering or orienting the device in flight. These devices generally follow the principle of a socalled tilting or sliding control. As indicated in FIG. 3, the tilting control is accomplished by the control cables 1a, 1b and 1c which are connected to the fettering cable at 1d at their one ends and which have their opposite ends wound around respective winding drum elements 32a and 33a (the other of which is not indicated). The length of the control cables 1a and 1b can be selectively changed, either individually or simultaneously, by means of adjusting motors generally designated 32 and 33. The motors are controlled to wind or unwind the cables 1a and 1b the associated drums 32a and 33a for the purposes of causing tilting movement of the central body 2, as desired. By changing the length of one or more of these control cables 1a and 1b, it is possible to control the flying body about its longitudinal and transverse axes to change the position of the device relative to the fettering cable 1 within a limited range.

In the embodiment of FIG. 4, the fettering cable 4 is connected to a lower or outer arm 34a of a ball joint generally designated 34 which is swivelably mounted on the bottom wall 2b of the central body 2. An interior or upper arm 34b of the ball joint 34 projects into the interior of the central body 2 and is connected to two adjusting spindles 37 and 38. The spindles 37 and 38 are driven by respective motors 35 and 36 through a transmission or gearing 35a and 36a. The adjusting motors 35 and 36 are secured at the inner circumference of the central body wall by means of respective ball joints 39 and 40. When one of the motors is switched on, then it causes, through its respective transmission portions 35a or 36a, the adjusting spindles to be displaced to cause rocking of the ball joints, and in this manner the flying body is tilted about its longitudinal or transverse axes to cause it to migrate away from its initial hovering position.

In FIG. 5 still another embodiment is indicated for controlling the flying body about its longitudinal and transverse axes. The fettering cable 1 is connected to a nut 42 which may be displaced backwardly and forwardly on a threaded spindle 41 upon rotation of the latter. Adjusting motors 43 and 44 are mounted on brackets on a bottom wall 2b'' of the central body 2''. The motor 43 includes a transmission 43a which drives a threaded spindle 46 which is rotatably mounted on bearing members 45. A nut 47 is arranged to move backwardly and forwardly on the spindle 46, and it serves as a rotary bearing for the threaded spindle 41 and a bearing for a stationary guide rod 48. The other end of the spindle 41 and of the guide rod 48 is received in the transmission part 44a of the motor 44. The transmission part 44a provides a rotation transmission from the motor 44 to the spindle 41. The movement of the spindle 41 and the guide rod 48 parallel to the spindle 46 is assured by means of guide rod 49 which slidably carries the transmission part 44a. The motors 43 and 44 may be selectively actuated for the purposes of shifting the position of the nut 42, both transversely and longitudinally. In this manner the position of the connection of the central body 2'' to the fettering cable 1 is shifted so that the device may be maneuvered in the air.

In addition to the advantages of a construction of the captive rotary wing aircraft per se, a number of advantages are obtained with the construction of the present invention which are briefly summarized as follows:

(1) Since the rotary wing aircraft acts as a gyroplane it is stable, while a helicopter proper is not stable.

(2) Since the flight sustaining propeller is in a forward flight condition, the energy requirement is smaller for rotating the same than in a corresponding helicopter during hovering flight, even when considering the efficiency of the individual propellers which are necessary for the drive.

(3) The driving engines can drive the propellers without intermediate switching of transmission gearing.

(4) The propellers have optimum dimensions for a narrow forward flight range.

(5) When the aircraft is used for military purposes, the device can be constructed to a very small size so that it is hardly visible at great distances.

(6) Due to the fact that the device does not need any transmission for the propeller drive and, in addition, because of the use of the light maneuvering propellers no rotor head control is necessary so that the flying body can be made of a lightweight construction.

(7) If an electric motor drive is employed, then very little noise is created.

(8) When the driving engines for the propellers fail, then the aircraft will still be capable of autorotation.

(9) The flight maintaining propellers which create the lifting of the aircraft can be very small and are therefore inexpensive to manufacture.

While specific embodiments of the invention have been shown and described in detail to illustrate the application of the inventive principles, it will be understood that the invention may be embodied otherwise without departing from such principles.

The embodiments of the invention in which an exclusive property or privilege is claimed are defined as follows:

1. A captive or fettered rotary wing aircraft comprising a central body adapted to be connected to a fettering cable, a rotary body rotatably mounted on said central body and having at least two carriers extending outwardly in opposite directions in respect to each other, at least one of the carriers having at its free end propulsion means for rotating said carrier about its mounting on said central body, and a flight sustaining rotor rotatably mounted adjacent the end of each of said carriers for rotation about a vertical axis.

2. A rotary wing aircraft according to claim 1, wherein said carriers are connected with said rotary body by releasable couplings.

3. A captive rotary wing aircraft according to claim 1, wherein at least one of said carriers is constructed as a wing which assists aerodynamically in lifting the aircraft.

4. A captive rotary wing aircraft according to claim 1, wherein said central body is constructed as a receptacle for strategic loads.

5. A rotary body according to claim 1, wherein said propulsion means for rotating said carriers includes a propeller mounted for rotation about a substantially horizontal axis and means adjacent the respective ends of said carriers for mounting an electric motor for rotating said propeller.

6. A rotary wing aircraft including a central body, a rotatable body rotatably mounted on said central body, at least one carrier extending radially outwardly from said central body, means located adjacent the outer end of said carrier for rotating said carrier with said rotatable body on said central body, and a freely rotatable flight sustaining rotor rotatably mounted on said carrier adjacent the outer end thereof and being rotatable by rotation of said carrier.

7. A rotary wing aircraft including a central body member adapted to be connected to a fettering cable, a rotatable body rotatably mounted on said central body member and including at least one carrier arm extending radially outwardly therefrom, a propeller carried adjacent the outer end of said carrier arm and mounted thereon for rotation about a substantially horizontal axis, means to rotate said propeller and to cause rotation of said carrier arm about said central body member, a flight sustaining rotor rotatably mounted about a substantially vertical axis adjacent the outer end of said carrier arm and torque compensating means operatively associated with said central body member for maintaining an attitude of said central body member permitting connection to a fettering cable.

8. A rotary wing aircraft according to claim 7, including at least two carrier arms extending radially outwardly in opposite directions from said central body, each of said carrier arms having a rotary propeller carried adjacent the outer end thereof and mounted for rotation about a substantially horizontal axis with means to rotate said propeller, and a flight sustaining rotor for rotation about a substantially vertical axis with means for rotating said flight sustaining rotor.

9. An aircraft according to claim 7, wherein said carrier arm comprises a first arm portion extending outwardly from said rotating body in one direction, and including a second arm portion extending outwardly from said rotating body in an opposite direction from said first arm portion, said second arm portion carrying a counterweight.

10. A captive or fettered rotary wing aircraft comprising a central body adapted to be connected to a fettering cable, a rotary body rotatably mounted on said central body and having at least two carriers extending outwardly in opposite directions in respect to each other, at least one of the carriers having at its free end propulsion means for rotating said carrier about its mounting on said central body, a flight sustaining rotor rotatably mounted adjacent the end of each of said carriers for rotation about a vertical axis, a fettering cable connected to said central body, and a positioning motor carried by said central body having a rotor shaft connected to said rotatable body and carrying said rotatable body for rotative movement with said rotor shaft in respect to said central body, the position of said central body in relation to said rotatable body being controlled by the excitation of said motor.

11. A captive or fettered rotary wing aircraft comprising a central body adapted to be connected to a fettering cable, means on said body for connecting said body to a fettering cable, a rotary body rotatably mounted on said central body and having at least one carrier arm extending outwardly therefrom, propulsion means located adjacent the end of said carrier arm for rotating said carrier arm with said rotary body on said central body and causing a torque at said central body, means for compensating for the torque produced at said central body by rotation of said carrier arm and said rotary body, and a flight sustaining rotor rotatably mounted adjacent the end of said carrier arm for rotation about a vertical axis.

12. A fettered aircraft according to claim 11, including a fettering cable, and positioning control means connected between said fettering cable and said means for connecting said central body to said fettering cable, said positioning control means effecting tilting of said central body for effecting movement of said aircraft.

13. An aircraft according to claim 12, wherein said means for connecting said central body to said fettering cable includes a plurality of widely spaced winding drum elements on said central body, and said positioning control means includes a plurality of cable elements connected from said fettering cable to said winding drum elements on said central body, and means for varying the length of at least one of said connecting cables.

14. A captive or fettered rotary wing aircraft according to claim 11, including weight means secured to said rotary body for counterbalancing said carrier arm.

15. A captive or fettered rotary wing aircraft comprising a central body adapted to be connected to a fettering cable, means on said body for connecting said body to a fettering cable, a rotary body rotatably mounted on said central body and having at least one carrier arm extending outwardly therefrom, propulsion means located adjacent the end of said carrier arm for rotating said carrier arm with said rotary body on said central body and causing a torque at said central body, means for compensating for the torque produced at said central body by rotation of said carrier arm and said rotary body, and a flight sustaining rotor rotatably mounted adjacent the end of said carrier arm for rotation about a vertical axis, said flight sustaining rotor being driven solely by rotation of said carrier arm.

16. A captive or fettered rotary wing aircraft comprising a central body adapted to be connected to a fettering cable, a rotary body rotatably mounted on said central body and having at least two carriers extending outwardly in opposite directions in respect to each other, at least one of the carriers having at its free end propulsion means for rotating said carrier about its mounting on said central body, a flight sustaining rotor rotatably mounted adjacent the end of each of said carriers for rotation about a vertical axis, a ball joint member swivelably mounted on said central body and including a first arm portion adapted to be connected to the fettering cable and a second arm portion extending in an opposite direction from said first arm portion and into said central body, and means within said central body connected to said second arm portion for shifting the position of said second arm portion and consequently said first arm portion which is adapted to be connected to said cable for varying the position of said central body in respect to the fettering cable when said central body is connected thereto.

17. A captive or fettered rotary wing aircraft comprising a central body adapted to be connected to a fettering cable, a rotary body rotatably mounted on said central body and having at least two carriers extending outwardly in opposite directions in respect to each other, at least one of the carriers having at its free end propulsion means for rotating said carrier about its mounting on said central body, a flight sustaining rotor rotatably mounted adjacent the end of each of said carriers for rotation about a vertical axis, and means for controlling the position of said central body in relation to the fettering cable including a captive nut adapted to be connected to a fettering cable, a threaded spindle, said captive nut being engaged with said threaded spindle and being movable therealong upon rotation of said threaded spindle, and means for shifting said threaded spindle transversely and for rotating said spindle for varying the position of said nut in relation to the axis of said central body and hence the position of said cable in respect to said central body when said central body is connected thereto through said nut.

References Cited by the Examiner

UNITED STATES PATENTS

| 2,589,826 | 3/52 | Larsen | 244—17.17 X |
| 2,980,365 | 4/61 | Yohe | 244—17.23 X |
| 2,995,740 | 8/61 | Schreckengost | 244—17.17 X |
| 3,065,799 | 11/62 | McCarty | 244—17.19 X |

FOREIGN PATENTS

| 523,371 | 4/55 | Italy. |
| 569,094 | 1/59 | Belgium. |

FERGUS S. MIDDLETON, *Primary Examiner.*